United States Patent
Kuhn et al.

(10) Patent No.: US 9,675,062 B1
(45) Date of Patent: Jun. 13, 2017

(54) DRIP BAG SYSTEMS, METHODS AND APPLICATIONS

(71) Applicant: Thought Streams, LLC, Wilmington, DE (US)

(72) Inventors: Todd A. Kuhn, Gulfport, MS (US); Matthew Spriggs, Royal Oak, MI (US)

(73) Assignee: Thought Streams, LLC, Roodhouse, IL (US)

( * ) Notice: Subject to any disclaimer, the term of this patent is extended or adjusted under 35 U.S.C. 154(b) by 54 days.

(21) Appl. No.: 14/796,364

(22) Filed: Jul. 10, 2015

(51) Int. Cl.
*F04F 10/00* (2006.01)
*A01M 31/00* (2006.01)

(52) U.S. Cl.
CPC .................................. *A01M 31/008* (2013.01)

(58) Field of Classification Search
CPC ..... A01M 31/008; B67D 1/0456; B67D 3/00; B67D 3/0048; B67D 7/0277
USPC .............. 222/416, 187; 239/34, 37, 44; 43/1
See application file for complete search history.

(56) References Cited

U.S. PATENT DOCUMENTS

| | | | | | |
|---|---|---|---|---|---|
| 2,036,191 | A | * | 4/1936 | Bissell | B67D 3/00 137/153 |
| 2,774,522 | A | * | 12/1956 | Cosulich | B01L 3/0203 222/416 |
| 2,991,911 | A | * | 7/1961 | Spain | A47L 15/4445 137/134 |
| 3,216,663 | A | * | 11/1965 | Frampton | A01G 27/001 137/106 |
| 3,338,564 | A | * | 8/1967 | Roeder | C23G 3/00 123/198 A |
| 3,339,801 | A | * | 9/1967 | Hronas | E03D 9/033 137/126 |
| 4,000,738 | A | * | 1/1977 | Howell | A61J 1/10 137/135 |
| 4,010,750 | A | * | 3/1977 | Howell | A61M 5/14 137/135 |
| 4,451,359 | A | * | 5/1984 | Osterberg | B03B 5/623 138/41 |
| 4,667,430 | A | * | 5/1987 | Ziese, Jr. | A01M 31/008 119/711 |
| 4,846,206 | A | * | 7/1989 | Peterson | A01G 27/001 137/1 |
| 4,938,420 | A | * | 7/1990 | Ruttenberg | A01G 27/005 137/132 |
| 5,220,741 | A | * | 6/1993 | Burgeson | A01M 31/008 222/181.3 |

(Continued)

OTHER PUBLICATIONS

"Bag" Merriam-Webster.com. Merriam-Webster, Oct. 2016.*

Primary Examiner — J. Casimer Jacyna
Assistant Examiner — Benjamin R Shaw
(74) Attorney, Agent, or Firm — Brian S. Steinberger; Law Offices of Brian S. Steinberger, PA

(57) ABSTRACT

Systems, devices, and methods for a one-time disposable device arrangement for dispersing liquids of varying viscosities, or their constituents, in a metered manner over a definable period of time. The invention employs a flexible reservoir, of varying size, shape, and configuration, along with a calculated, finite length of looped flexible tubing, one of varying size, shape and configuration. The device arrangement can be hung over an area where it is desired to attract animals such as deer by dispensing liquids, such as but not limited to animal attractants, such as deer urine and buck jam, and the like.

17 Claims, 12 Drawing Sheets

(56) References Cited

U.S. PATENT DOCUMENTS

| | | | |
|---|---|---|---|
| 5,238,187 A * | 8/1993 | Zlotnik | A61L 9/127 |
| | | | 222/187 |
| 5,279,062 A | 1/1994 | Burgeson | |
| 5,361,527 A * | 11/1994 | Burgeson | A01M 31/008 |
| | | | 43/1 |
| 5,423,794 A * | 6/1995 | Adolf | A61J 1/10 |
| | | | 222/416 |
| 5,542,605 A * | 8/1996 | Campau | A01G 27/001 |
| | | | 222/187 |
| 5,634,592 A * | 6/1997 | Campau | A01G 27/001 |
| | | | 239/51 |
| 5,850,972 A * | 12/1998 | Campau | A01G 27/001 |
| | | | 222/187 |
| 5,971,208 A * | 10/1999 | Kennedy | A01M 31/008 |
| | | | 119/73 |
| 6,158,668 A * | 12/2000 | Burgeson | A01M 31/008 |
| | | | 222/187 |
| 8,510,984 B2 * | 8/2013 | Burgeson | A01M 31/008 |
| | | | 222/181.1 |
| 8,623,346 B1 | 1/2014 | Kuhn | |
| 8,739,455 B2 | 6/2014 | Burgeson | |
| 2005/0189433 A1 * | 9/2005 | Burgeson | A01M 31/008 |
| | | | 239/44 |
| 2005/0189434 A1 * | 9/2005 | Burgeson | A01M 31/008 |
| | | | 239/44 |
| 2008/0054021 A1 | 3/2008 | Brown | |
| 2009/0050711 A1 * | 2/2009 | Castner | A01M 31/008 |
| | | | 239/152 |

\* cited by examiner

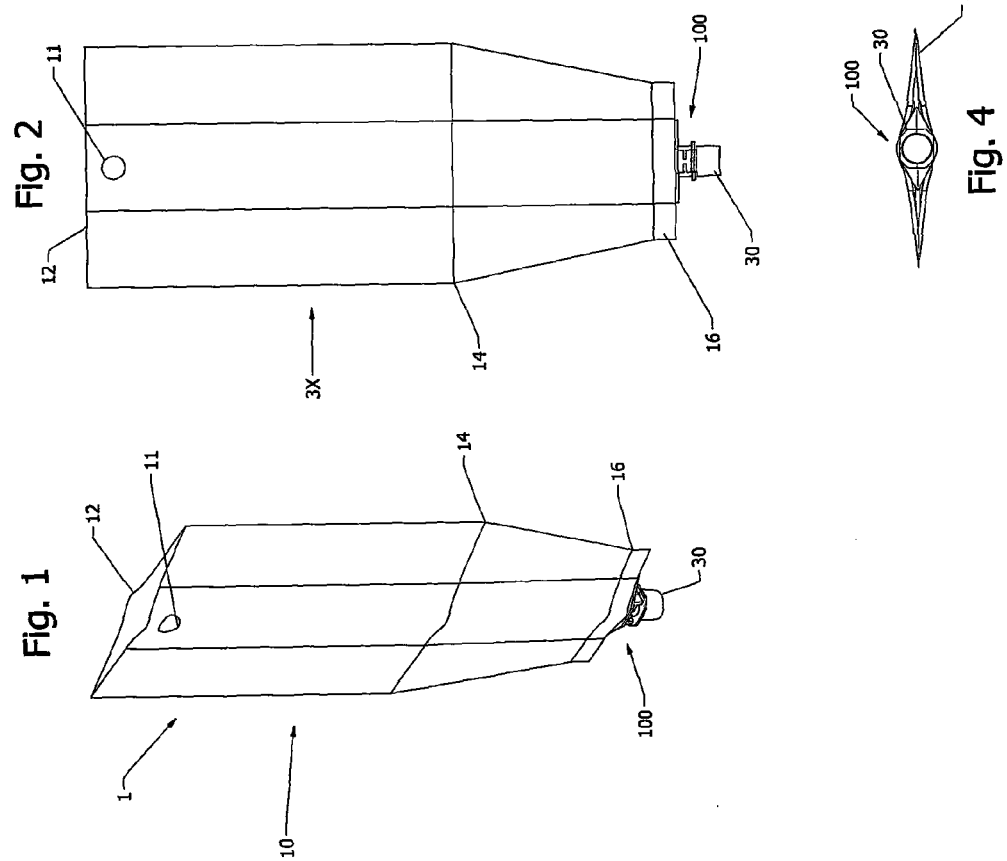

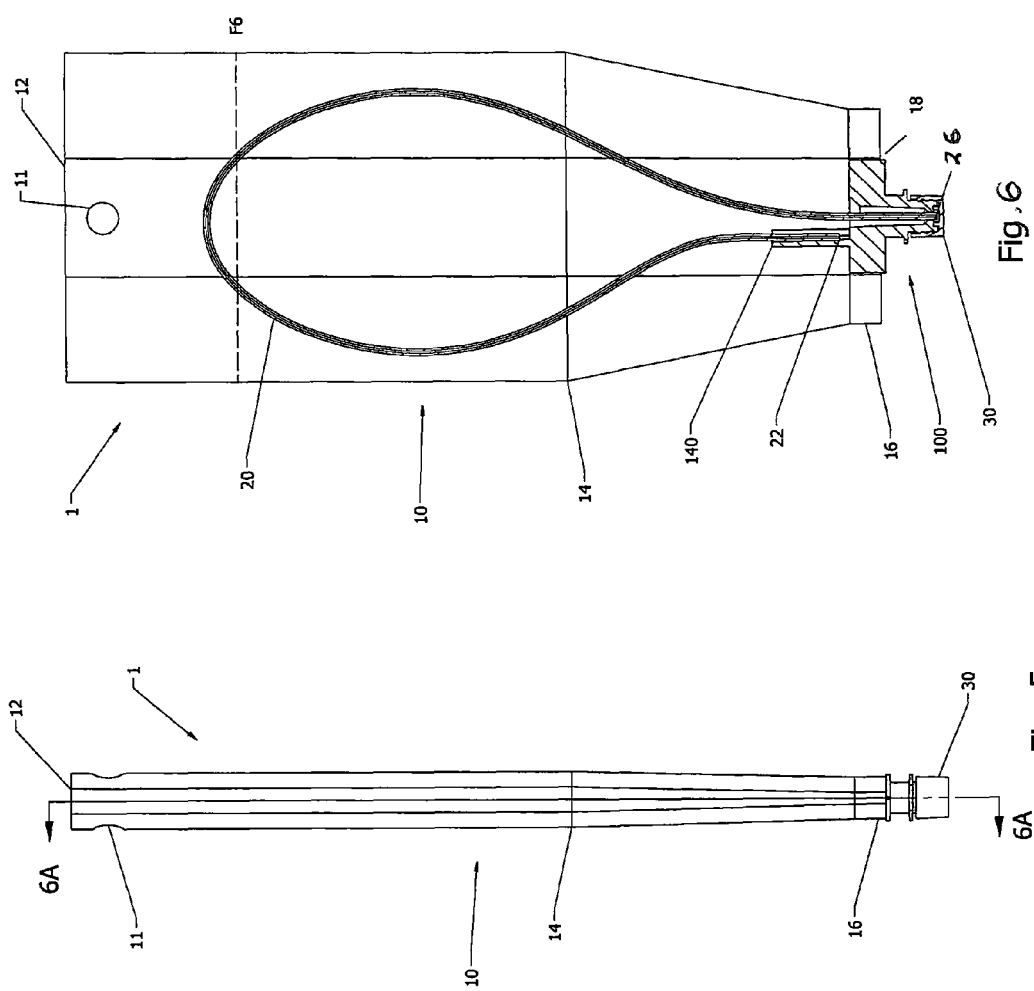

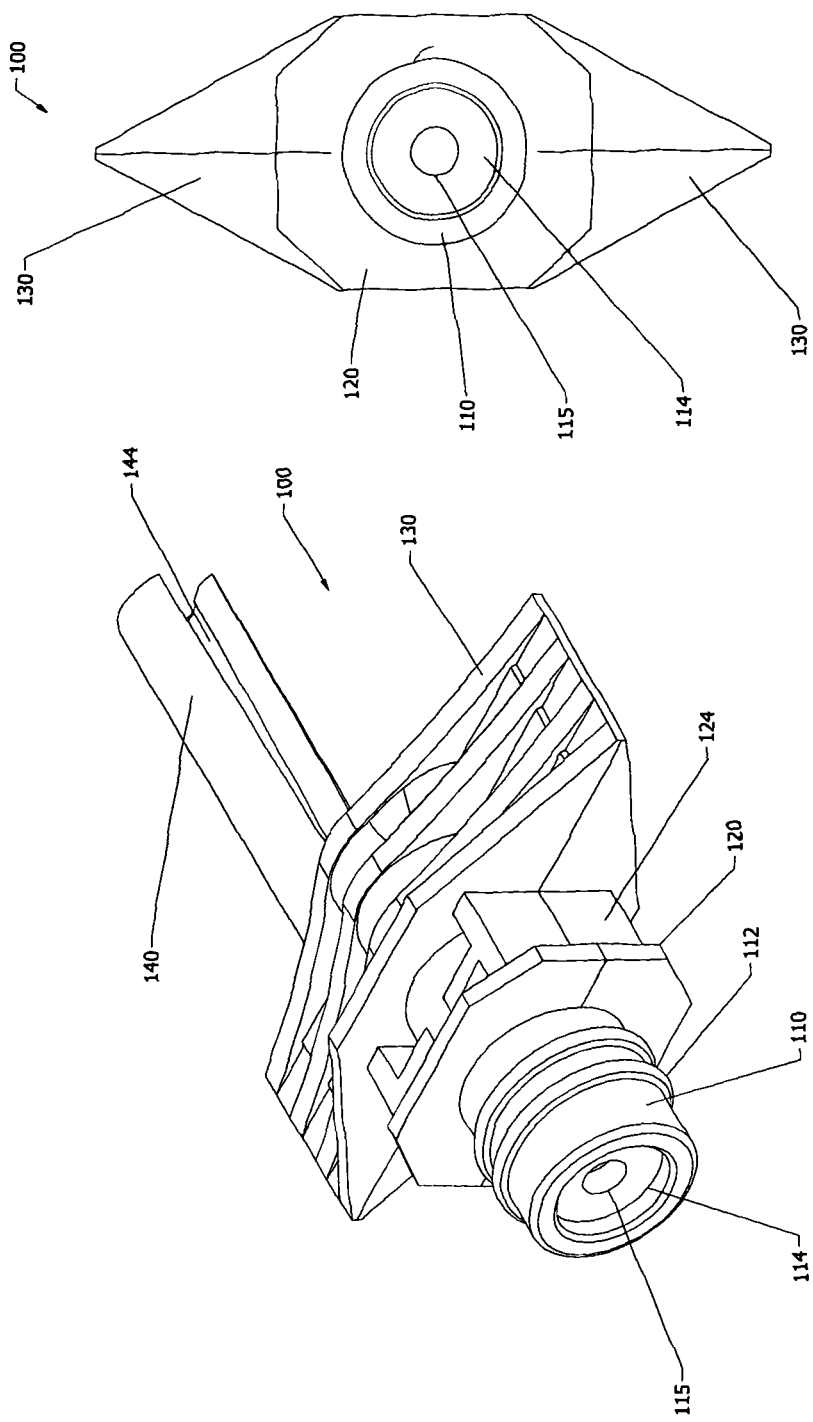

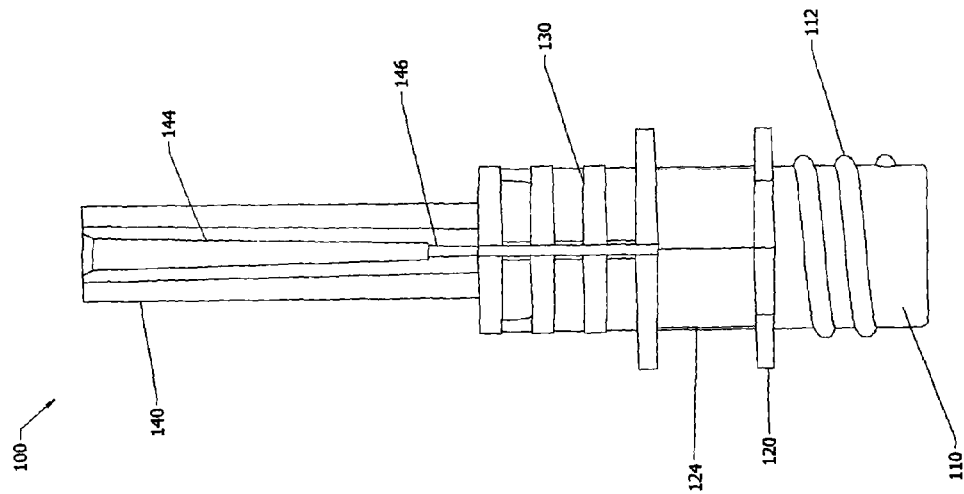
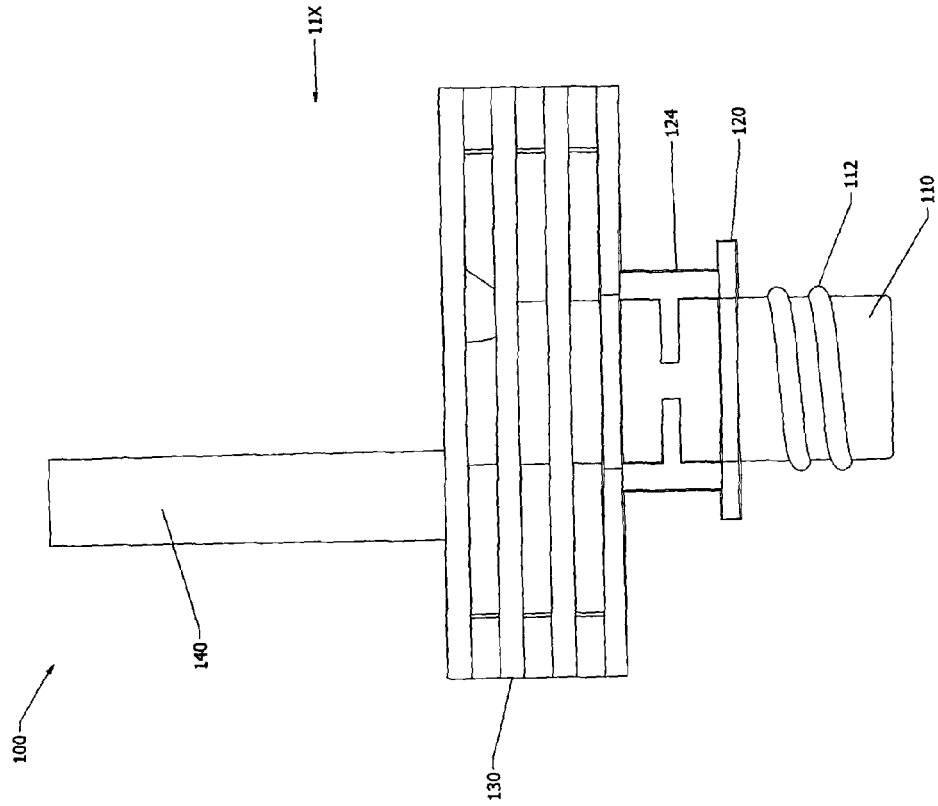
Fig. 10
Fig. 11

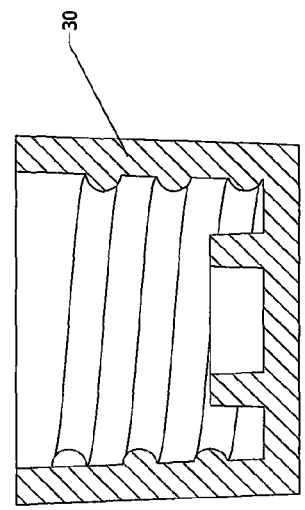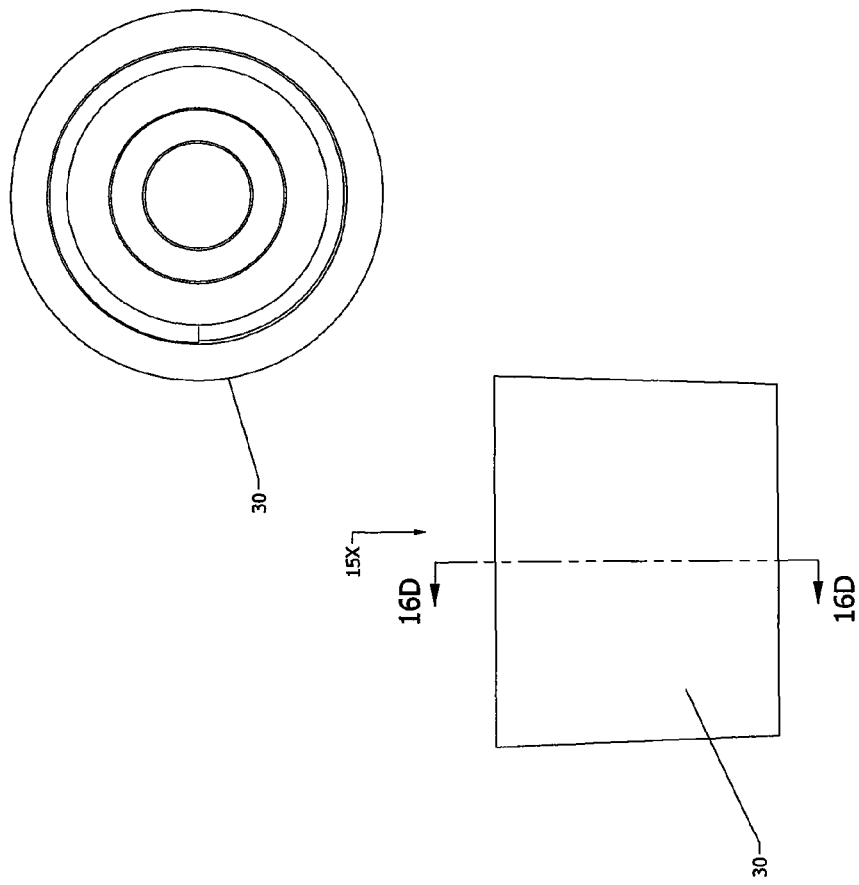

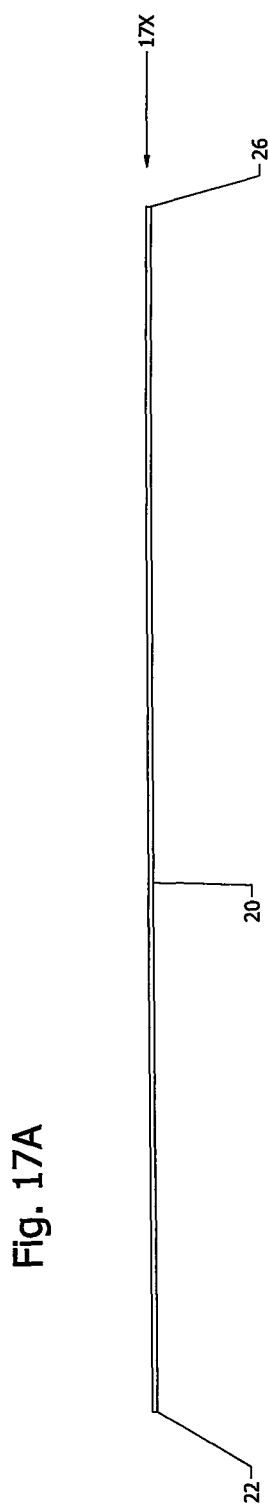
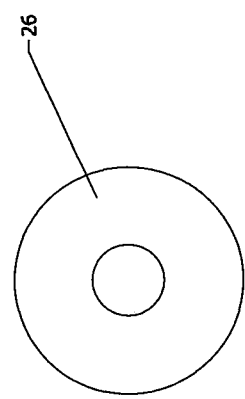
Fig. 17A
Fig. 17B

Effects of Change in Viscosity

Effects of Change in Tube Length

Effects of Change in Hydraulic Diameter

Experimental vs Model Projections

DRIP BAG SYSTEMS, METHODS AND APPLICATIONS

FIELD OF INVENTION

The present invention relates to the field of hunting game animals, specifically, to devices, apparatus, systems and methods for delivering a timed release of animal attractant scented liquids in the wild using a dispensing bag with a tube that continuously siphons the liquids from the bag in a calculable, timed release manner.

BACKGROUND AND PRIOR ART

Game animals, particularly those hunted for food and/or sport, such as but not limited to deer, are attracted by scents varying from those of other animals and odorous attractant scents such as those of food. It is these scents which hunters use to pull animals closer for harvest opportunities.

During mating seasons, male animals, as part of the mating ritual, attempt to attract females by "scraping" the ground, using their hoofs, at desirable locations and urinating in the scrape in an attempt to attract females. The females in turn, when attracted, deposit a female hormone in the "scrape" which is highly attractant to males. Hunters, in an attempt to mimic these attractants, have developed commercially available "attractant scents" which substantially duplicate the male and female mating scents.

Those who wish to examine animals at close range, such as hunters, routinely manually disperse such scents on the ground in an attempt to attract their quarry.

In some cases, hunters prepare the ground, by making a mock scrape using various implements, to simulate a deer "scrape" before dispensing attractant scent liquid into the scrape. However, humans entering these sensitive areas can disturb the animals, in ways known only to animals. In many cases, these trespasses into an animal's area provide persistent unseen warnings which tend to keep the desired animal from approaching.

Various devices have been developed over the years which attempt to continuously or periodically deliver portions of scented liquids to the desired spot without human interaction. The present invention provides significant improvements over the prior system as described below.

U.S. Pat. Nos. 5,279,062; 5,361,527 and 5,220,741 all to Burgeson describe devices for dispensing a scented liquid (scent) onto the ground. The device employs a rigid camouflaged scent container having a cap with an exterior nozzle tube which may be straight or bent through 180 degrees into a J shape or through 360 degrees into a circular shape. The container is suspended over the ground and is partially filled with the scented liquid. As the air in the space over the liquid expands during the day it pushes out a volume of scented liquid. However, these devices have several problems.

The Burgeson patents suffer from the defects that the scent container can be only partly filled. Also it must be clear that the amount of liquid scent delivered depends on the unfilled volume within the container. When the container is more filled, the air volume remaining is less. Thus, less liquid scent can be delivered for a given temperature change. Principle operations of these devices are dependent on temperature changes.

Additionally, the Burgeson devices require a rigid container must be used, when the container is filled, it has a large mass and must respond more slowly to any temperature change. By contrast, when the container is nearly empty, there is a large gas volume within the container which will cause a larger amount of liquid scent to be delivered for a given temperature change. Further, when the container is nearly empty, the small mass of liquid heats easily, thereby causing a widely varying rate and quantity of liquid scent to be delivered, depending on the fraction of the bottle which is filled.

Furthermore, the containers in the Burgeson patents must be made of some rigid material such as glass. Such a container is easily susceptible to being broken, should the container fall from the tree or support where it is suspended. Additionally, if the container is made of rigid plastic, the container can crack over time with constant exposure to sunlight or other environment factors, such as, heat, cold, or changes in temperature over time.

U.S. Pat. No. 8,510,984 to Burgeson describes a temperature regulated, pressure activated liquid scent dispenser. The pressure in the interior of the container increases as ambient temperature increases. A release structure of the container will release a portion of the liquid scent once a threshold pressure or threshold amount of pressure build-up is reached in the interior of the container.

This device requires filling the interior volume with a liquid scent so that the interior volume also includes a volume of air, suspending the dispenser over a ground surface, and dispensing the liquid scent from the interior volume through the release structure. Due to an increase of pressure of the volume of air, and upon reaching a threshold air pressure, the release structure releases a portion of the liquid scent from the interior volume.

Similar to the other Burgeson Patents: U.S. Pat. Nos. 5,279,062; 5,361,527 and 5,220,741 these devices provide for liquid delivery dependent on temperatures changes to shift atmospheric pressure inside the rigid vessels in order to drive the liquid dispersal.

U.S. Pat. No. 8,739,455 to Burgeson describes a temperature regulated, pressure activated liquid scent dispenser. The pressure in the interior of the container can increase as ambient temperature increases. A release structure of the container releases a portion of the liquid scent once a threshold pressure or threshold amount of pressure build-up is reached in the interior of the container.

The Burgeson '455 patent device provides for filling the interior volume with a liquid scent so that the interior volume also includes a volume of air, suspending the dispenser over a ground surface, and dispensing the liquid scent from the interior volume through the release structure. Due to an increase of pressure of the volume of air, and upon reaching a threshold air pressure, the release structure releases a portion of the liquid scent from the interior volume.

Similar to the previously referenced Burgeson, this device includes a, pressure interior to the vessel that is dependent on ambient temperature variations to create internal vessel pressure to drive the liquid delivery system.

U.S. Pat. No. 5,971,208 to Kennedy describes a device for delivering an animal attractant scented liquid employing a flexible walled container with an external gas filled balloon strapped to the container so positioned that expansion and contraction of the gas within the balloon, in response to temperature changes, causes the wall of the container to flex so as to discharge liquid from the container when the temperature rises, and cease discharging on a temperature drop.

Similar to the other prior art is in its use of atmospheric pressure and temperature changes to expand the gas inside the dispersal drive mechanism. Here, the Kennedy '208 patent uses externally mounted balloons.

U.S. Published Patent Application. 20080054021A1 to Brown et al. describes a product directed at the deer hunting market for scent application and dispersal that uses a molded, rigid container capable of being filled with liquid scent and then dispensed in a multiple ways, including a flip top cap for direct placement of its contents to a variety of specific areas, using scent wicks, cotton balls, etc. to establish scent stations (dipping these into open liquid reservoir). Similar to the other prior art, Brown '402 relies on temperature changes to drive fluid dispersal.

Thus, the need exists for solutions to the above problems with the prior art that does not require head space nor temperature changes to drive animal attractant liquid therefrom.

SUMMARY OF THE INVENTION

A primary objective of the present invention is to provide devices, apparatus, systems and methods for delivering a timed release of animal attractant scented liquids in the wild without the need for head space nor temperature changes to drive and transport the liquid for metered and predictable delivery.

A secondary objective of the present invention is to provide devices, apparatus, systems and methods for delivering a timed release of animal attractant scented liquids in the wild that utilizes a tube and fitment assembly as a simple flow regulator with siphon and capillary action fluid drivers unlike any previous inventions.

A third objective of the present invention is to provide for one-time disposable devices, apparatus, systems and methods for dispersing liquids of varying viscosities, or their constituents, in a metered manner over a definable period of time.

A fourth objective of the present invention is to provide for devices, apparatus, systems and methods that include a flexible reservoir, of varying size, shape, and configuration, along with a calculated, finite length of looped flexible tubing, one of varying size, shape and configuration to dispensing animal attractant liquids.

The invention allows for a one-time use, disposable device configured with a flexible, varying geometry of contiguous tubing and fitment create three (3) basic physical effects. These include, 1) a restriction to flow; 2) siphon(ing) action; and 3) capillary actions.

These three (3) physical effects create a small, linear fluid flow rate that is non-thermally dependent while allow draining all the fluid from the bag regardless of the amount of viscous commodity in the bag (reservoir) while providing for a mathematically calculable drip rate[3].

The degree of restriction to fluid flow (non-thermally dependent) is directly dependent on the hydraulic diameter of the tube, the length of the tube and the physical properties of the fluid constituent(s). All of these properties are manipulated, through mathematical model, to account for various viscosities and differing (dynamic) volumes of liquid creating different head pressures.

The capillary and siphon effects initiate fluid flow once the fitment cap is removed, and assist in supporting fluid flow once sufficient head pressure can no longer overcome the flow restriction in the tube and drive fluid through the tubing.

The flexible bag is driven to flow by the gravitational effects on the fluid (head pressure and the siphon effect), atmospheric pressure (forces on the flexible bag, unlike rigid containers, which contribute to the head pressure) and slowed only by the restriction to flow in the tubing.

The flexible nature of both the bag and the looped tubing allow the contents of the bag to empty to a level adjacent to the lowest level of the flexible tubing inside of the bag. Unlike previous inventions which drained fluid levels are dependent solely on available head pressure.

Further objects and advantages of this invention will be apparent from the following detailed description of the presently preferred embodiments which are illustrated schematically in the accompanying drawings.

BRIEF DESCRIPTION OF THE FIGURES

FIG. 1 is a front right perspective view of a drip bag, tube and fitment assembly of the invention.

FIG. 2 is a front view of the drip bag, tube and fitment assembly of FIG. 1.

FIG. 3 is a side view of the drip bag, tube and fitment assembly of FIG. 2 along arrow 2X.

FIG. 4 is an enlarged bottom view of the drip bag, tube and fitment assembly of FIG. 3 along arrow 4X.

FIG. 5 is another side view of the drip bag, tube and fitment assembly of FIG. 3.

FIG. 6 is a cross-sectional view of the drip bag, tube and fitment assembly of FIG. 5 along arrows 6A.

FIG. 8 is an enlarged perspective view of the fitment used in the drip bag, tube and filament assembly of FIG. 1.

FIG. 9 is a bottom view of the fitment of FIG. 8.

FIG. 10 is a front view of the fitment of FIG. 8.

FIG. 11 is a side view of the fitment of FIG. 10 along arrow 11X.

FIG. 14 is an enlarged view of the cap used with the fitment in FIGS. 1-7.

FIG. 15 is a top view of the cap of FIG. 14 along arrow 15X.

FIG. 16 is a cross-sectional view of the cap of FIG. 14 along arrows 16D.

FIG. 17A is a side view of the tube used in the drop bag, tube and filament assembly of FIGS. 1-7.

FIG. 17B is an enlarged view of the end of the tube of FIG. 17A along arrow 17X.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 7:
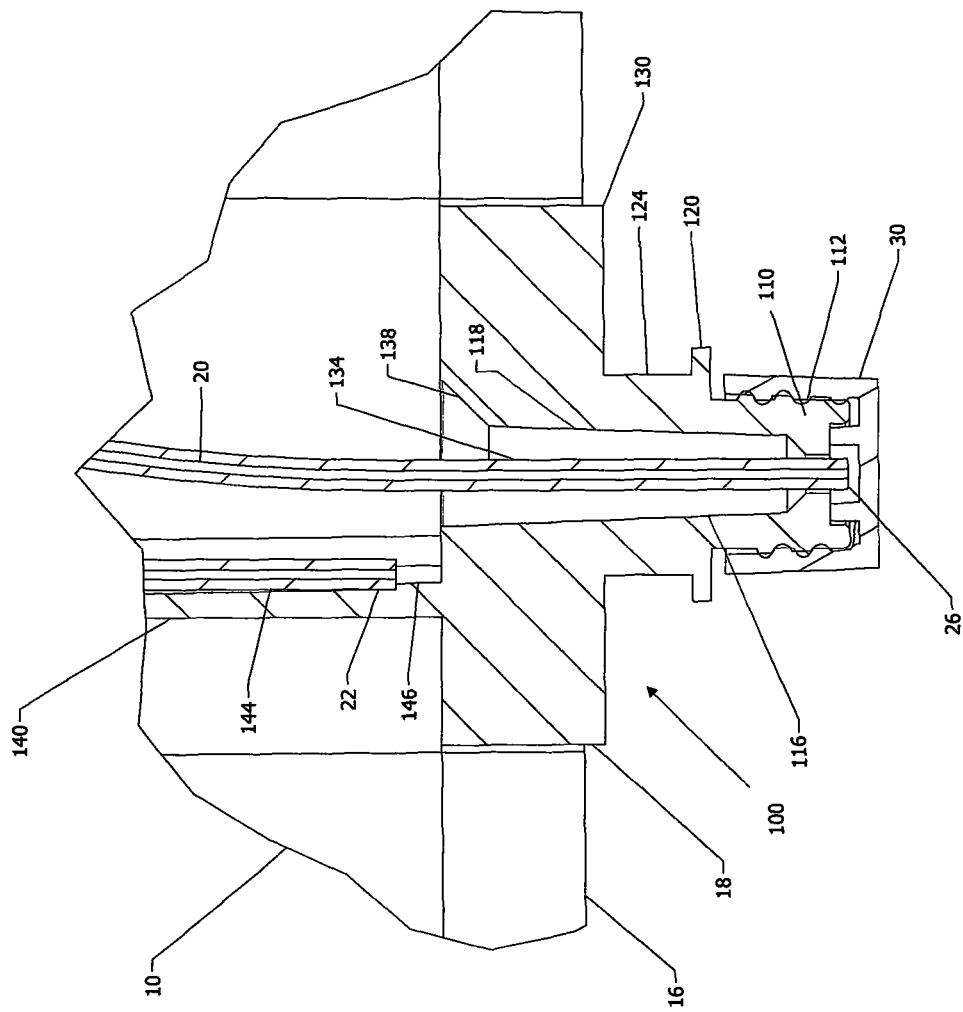
FIG. 7 is an enlarged lower front right perspective view of the dispensing portion 7B of the drip bag, tube and fitment assembly of FIG. 6.

A list of components will now be described.
1 bag, tube and fitment assembly
10 container (such as but not limited to a flexible bag, and the like)
11 hanging hole
12 top
14 mid-portion
16 lower dispensing end
18 insert opening for fitment
20 tube/tubing
22 input end
26 output end
30 cap for fitment
100 fitment
110 dispense nozzle
112 external threads
114 lower indentation
115 dispense nozzle through-hole
116 lower narrowing chamber
118 main channel
120 external stop ring
124 grip edges above stop ring
130 enlarged base (parallel ribs with triangular ends)
134 upper main channel
138 oblong upper entry to main channel
140 chimney for tube intake
144 narrowing main channel in chimney
146 tube stop FIG. 1 is a front right perspective view of a drip bag, tube and fitment assembly 1 of the invention. FIG. 2 is a front view of the drip bag, tube and fitment assembly 1 of FIG. 1. FIG. 3 is a side view of the drip bag, tube and fitment assembly 1 of FIG. 2 along arrow 2X. FIG. 4 is an enlarged bottom view of the drip bag, tube and fitment assembly 1 of FIG. 3 along arrow 4X. FIG. 5 is another side view of the drip bag, tube, and fitment assembly 1 of FIG. 3. FIG. 6 is a cross-sectional view of the drip bag, tube, and fitment assembly 1 of FIG. 5 along arrows 6A. FIG. 7 is an enlarged lower front right perspective view of the dispensing portion 7B of the drip bag, tube and fitment assembly 1 of FIG. 6.

Figure 13:
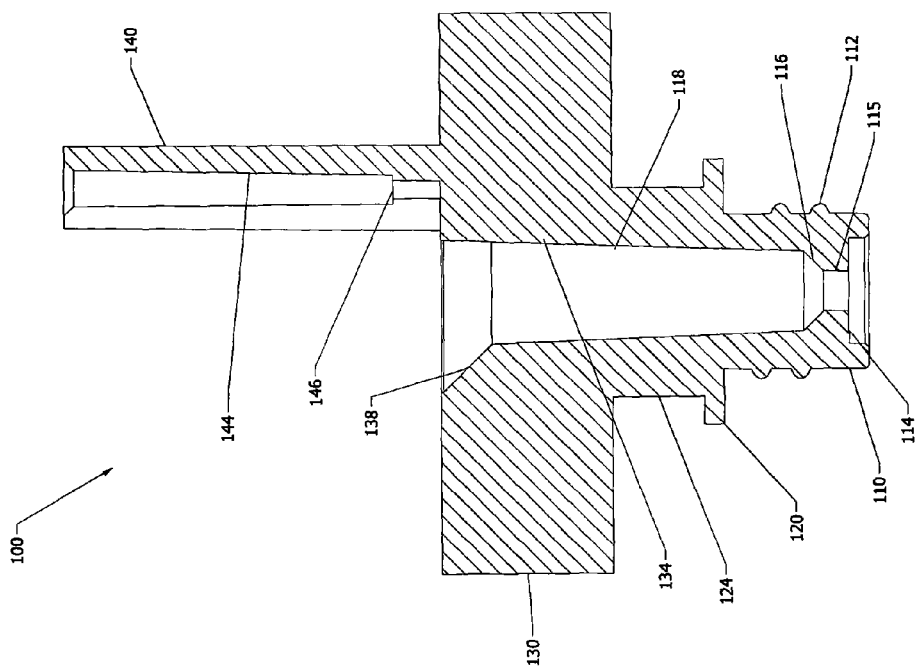
FIG. 13 is a cross-sectional view of the fitment of FIG. 12 along arrows 13C.
Figure 12:
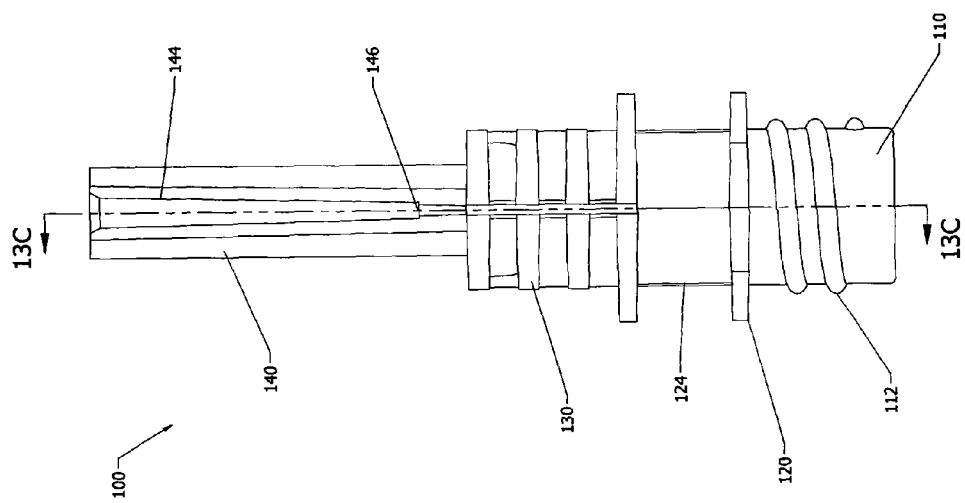
FIG. 12 is another side view of the fitment of FIG. 11.

FIG. 8 is an enlarged perspective view of the fitment 100 used in the drip bag assembly 1 of FIG. 1. FIG. 9 is a bottom view of the fitment 100 of FIG. 8. FIG. 10 is a front view of the fitment 100 of FIG. 8. FIG. 11 is a side view of the fitment 100 of FIG. 10 along arrow 11X. FIG. 12 is another side view of the fitment 100 of FIG. 11. FIG. 13 is a cross-sectional view of the fitment 100 of FIG. 12 along arrows 13C. The fitment 100 can be formed from polyethylene, and the like.

Referring to FIGS. 1-13, the dispensing bag, tube and filament assembly 1 includes a bag 10 with a bottom end 16 having a fitment 100 with a cap.

Bag 10 can be a front panel and a back panel attached at their sides. The panels can be formed from three layers: PET ((polyethylene terephthalate), foil (aluminum) and LLDPE (Linear low-density polyethylene). Bag 10 can have a length between lower dispensing end 16 and top end 12 of approximately 8.00 inches and a width between top end 12 and mid-portion 14 of approximately 3.25 inches. The top end 12 can have a hanging hole 11 there through to allow for the bag to be hung while being used.

The top end of the bag 10 can remain open while the bag 10 is being filled, and closed thereafter. On the bottom end 16 of the bag 10, the fitment 100 can be inserted into an opening 18.

A flexible tube 20 can have an input end 22 inside the narrowing main channel 144 of a chimney 140 sitting on a tube stop 146. The opposite end of tube 20 can pass through a oblong upper entry 138 into main channel 134 that passes through a main channel 118 into a lower narrowing channel 116 into a dispense nozzle 110 with tube output end 26 passing through a dispense nozzle through-hole 115 above a lower indentation 114. A cap with internal threads can rotate about external threads 112 on dispense nozzle 110 up to stop ring 120.

When assembling the fitment 100 grip edges 124 above the stop ring 120 can be gripped in one's hand so that enlarged base 130 which include parallel ribs with triangular ends can be inserted into the opening 18 in the bottom end 16 of the bag 10.

During operation of the drip bag, tube and fitment assembly 1, the upper end 12 can be filled with liquid up to a fill line, FL, which can be approximately 7.5 inches above lower dispensing end 16, with a bending portion of the tube 20 above the fill line, FL.

FIG. 14 is an enlarged view of the cap 30 used with the fitment in FIGS. 1-7. FIG. 15 is a top view of the cap 30 of FIG. 14 along arrow 15X. FIG. 16 is a cross-sectional view of the cap 30 of FIG. 14 along arrows 16D which shows internal threads inside of the cap 30.

FIG. 17A is a side view of the tube 20 used in the drop bag assembly 1 of FIGS. 1-7. FIG. 17B is an enlarged view of the end 26 of the tube 20 of FIG. 17 along arrow 17X.

Tube 20 can have a length of approximately 15.00 inches, and have a tube sleeve thickness of approximately 0.06 inches and an internal opening of approximately 0.02 inches, and be formed from polyethylene, and the like.

Referring to FIGS. 1-17B, the drip bag, tube and fitment assembly 1 can be basically a simple flow regulator with a siphon. The configuration of the tubing 20 and fitment 100 create two basic physical effects, a restriction to flow and a syphon. These two effects allow us create a very small, roughly linear flow rate while nearly draining all the fluid from the bag 10.

The degree of restriction to flow is mainly dependent on the hydraulic diameter of the tube 20, the length of the tube and the physical properties of the fluid. I can adjust the length and diameter of the tubing to account for various liquids having different viscosities and different volumes of liquid creating different head pressures.

During operation of the assembly 1, the syphon effects are there to help start the flow once the cap 30 is removed, and help keep the flow going once the head pressure can no longer overcome the flow restriction in the tube 20 and drive fluid through the tubing 20.

The bag 10 is driven to flow by the gravitational effects on the fluid (Head Pressure and the Syphon effect), atmospheric pressure (forces on the bag 10 that adds to the head pressure) and slowed only by the restriction to flow in the tubing 20.

A preferred embodiment of forming the drip bag, tube and fitment assembly 1 will now be described using an approximately 3 oz bag 10.

Referring to FIGS. 1-17B, the drip bag, tube and fitment assembly 1 can include a tube 20 that can be hot glued (off the shelf hot melt glue sticks) into the inside oblong upper entry 138 of the main channel 134 in the fitment 100 (FIG. 7). The output end 26 of the tube 20 can pass through the dispense nozzle through-hole 115 in the dispense nozzle 110 portion of the fitment 100. The inlet (input end) 22 of the tube 20 can then be looped around and placed into a holder (chimney 140) with input end against tube stop 16, which allows for fluid flow into the inlet end 22 of the tube 20 and creates the syphon effect, as the outlet end 26 of the tube 20 is lower in relation to the inlet end 22.

The inlet end 22 of the tube 20 can be approximately 1/8" from the lowest point inside the bag 10, so as to drain as much fluid from the bag 20 as possible. It is also placed in the holder (chimney 140) in such a manner as to avoid clogging the inlet end 22 of the tube 20 with any sediment that might be present from the animal attractant liquid that can be placed in the bag, such as but not limited to deer urine.

The enlarged base 130 enlarged base (parallel ribs with triangular ends) can then fixed (welded or melted) to the inner most layer inside of the bag 10 and completes the bottom seal 16 of the spout bag 10. The top 12 of the bag 10 can be left open (unsealed) to enable filling. The bag 10 can then be filled, using a gear type cold fluid pump, with a solution containing approximately 95% Water, 4% Deer Urine and 1% (by mass) of animal liquid attractants, in powder form.

The bag 10 can be filled with different animal attractant liquids such as those described in U.S. Pat. No. 8,623,346 to Kuhn et al., which is incorporated by reference in its' entirety, which are marketed under GLO-COTE™.

This mixture can be pumped into the bag 10 with tube 20 and fitment 100 already fixed to the bag 10 in the amount of approximately 88.72 mL or approximately 3 fl oz.

The bag 10 can be sealed using a table top band sealer producing an approximately 3/8 inch seal just under the hang hole 11. The filled and completely sealed drip bag 10 can then have a "Tin-Tie" (two wire twist tie) applied to the front right side seal of the bag 10. This "Tin-Tie" can be placed there for hanging the bag 10 while it is dispensing.

The flow can be initiated one of two ways; either by simply hanging the bag 10 after removing the cap 30 where the flow will start on its' own by the hydraulic head pressure at the fluid inlet end of the tube inside of the bag. Alternatively, the flow can be started by gently squeezing the bag 10 until the flow begins. The head pressure is sufficient to start the flow by itself. However depending on the state of the streamline in the tube 10 when opened could take an undetermined amount of time.

Holder (chimney) 140 and tube stop 146 is a vertical feature of the fitment which the inlet side of the tube 20 is placed and held for the use of the bag 10. There is a slit (opening) along the long side of the holder (chimney) 140 that runs through the entire length of the holder 140 from the top of the holder to the upper (inside) base of the fitment 100, including the tube stop 146. The tube stop 146 is essentially a ledge (stop) located inside the Holder 140 which prevents the tube from being pushed down too far during assembly and assures the proper siphon length is achieved (the vertical distance difference between the inlet and the outlet of the tube 20). The width of the tube stop 146 is equal to no more than half the wall thickness of the tube so as not to impede fluid from flowing into the tube inlet. Because the slit (opening) in both holder 140 and the tube stop 146 runs the entire length of the vertical holder 140, an inlet channel is created that is twice as wide as the hydraulic diameter of the tube 20 itself.

The tube 20 having an offset inlet 22 and outlet 26, creates a siphon effect which will continue to act on the fluid streamline in the tube 20 until the bag 10 is fully drained. This continues despite the hydraulic head pressure being reduced as a result of the fluid being partially drained.

The flow can be stopped in a few different ways, aside from the bag 10 functioning properly and it completely draining. Generally, the flow will continue, under normal conditions, until the fluid level drops below the fluid outlet. Flow can also stop if the tube 10 gets clogged by sediment, ice crystals, a small piece of glue etc. it will stop flowing.

Another possibility is if the streamline gets broken after the head pressure decreases to the point where it can't overcome the friction of the tube 10, should this happen the bag will stop flowing. For example, an air bubble could get pulled in the tube 10 and head pressure from the fluid can eventually push the bubble through the tube 10 to reestablish the streamline.

The current configuration of the assembly 1 having the novel bag 10 with fitment 100 in this example can dispense the urine and urine animal attractant solution at a rate approximately 0.246 mL/min, giving a target drain time of approximately 6 hours. This rate is calculated using a derived mathematical model based on the assumption of a laminar flow through the tube and the parameters listed below:

Dynamic Viscosity of the Fluid
Density of the Fluid
Ambient Temperature in which the bag will be used
Volume of the Fluid
Hydraulic Head of Fluid at the Tube Inlet
Atmospheric Pressure
Fluid Column Height in Filled Bag
Changes in Bag Shape as the Fluid Drains
Hydraulic Diameter of the Tube
Length of the Tube
Height of the Syphon
Acceleration of Gravity This model allows for the prediction of a drain time for any fluid through a tube/fitment assembly configured in a similar manner. Given a fluid viscosity, ambient conditions and the bag geometry, the tube parameters can be adjusted to produce a desired flow rate.

The derived differential equation on which the model is based does not have a closed form solution and an approximation was produced iteratively. Given access to a computer algebra system, a numeric solution could be found. Derived equations are as follows:

$$\frac{dh}{dt} = \text{Differential Change in } h[m] \text{ per Differential Change in Time}[s]$$

-continued $$\frac{dh}{dt} = -\frac{A_H}{A_T}\left[\frac{\left(\frac{-64\,\mu L}{2D^2}\right) \pm \left[\left(\frac{-64\,\mu L}{2D^2}\right)^2 - 2\rho[P_{atm} - \rho g h + \rho g(z_s)]\right]^{\frac{1}{2}}}{\rho}\right]$$

Where:

$A_T =$

Rectangular Approximation for Cross Sectional Area of bag at $h$ [$m^2$]

$A_T = B_w(h) * B_l(h)_w$ [$m^2$]

$B_w(h) =$ Bag Width Approximation Function [$m$]

$B_w(h) = -9.7079\,h^6 + 10.495\,h^5 -$
$\qquad 4.377\,h^4 + 0.8811\,h^3 - 0.0931\,h^2 + 0.0069\,h + 0.0003$ $B_l(h) =$ Bag Length Piecewise Defined Function [$m$]

$B_l(h) = \begin{cases} 0.0365 & \text{if } h > 0.06117 \\ \dfrac{h + 0.1196}{4.9331} & \text{if } 0 < h < 0.06117 \end{cases}$ $A_H = D =$ Hydraulic Diameter of Tube [$m^2$]

$\mu =$ Dynamic Viscosity [Pa·s]

$L =$ Hydraulic Length of Tube [$m$]

$\rho =$ Density $\left[\dfrac{kg}{m^3}\right]$ $h =$ Height of Fluid Column [$m$]

$g =$ Acceleration Due to Gravity $\left[\dfrac{m}{s^2}\right]$ $P_{atm} =$ Atmospheric Pressure [Pa]

$z_s =$ Siphon Length [$m$]

$t =$ Time [$s$]

There are four main parameters for drain time.
Dynamic "Shear" Viscosity ($\mu$)
Units in [Pa·s]
Length of the Tube (L)
Unit in [m]
Hydraulic Diameter of the Tube (D)
Units in [m]
Height of the Water Column in the Bag (H)
Units in [m]

Viscosity is a measure of a fluid's resistance to physical deformation by mechanical stress. In other words, it is a numerical value which describes how "thick" the liquid is. As such, the more viscous the fluid, the more resistance the fluid will show to flow and the longer it will take for that fluid to drain from the bag through the tube/fitment assembly.

Table 1 shows how the change in temperature changes both the density and dynamic viscosity of water.

TABLE 1

| Temperature (° C.) | Dynamic Viscosity ($\mu$) [Pa · s × $10^{-3}$] | Density ($\rho$) [kg/m$^3$] |
|---|---|---|
| 0 | 1.787 | 999.8 |
| 4 | 1.519 | 1000 |
| 10 | 1.307 | 999.7 |
| 20 | 1.002 | 998.2 |
| 30 | 0.798 | 995.7 |

TABLE 1-continued

| Temperature (° C.) | Dynamic Viscosity ($\mu$) [Pa · s × $10^{-3}$] | Density ($\rho$) [kg/m$^3$] |
|---|---|---|
| 40 | 0.653 | 992.2 |
| 50 | 0.547 | 988.1 |
| 60 | 0.467 | 983.2 |
| 70 | 0.404 | 977.8 |
| 80 | 0.355 | 971.8 |
| 90 | 0.315 | 965.3 |
| 100 | 0.282 | 958.4 |

Figure 18:
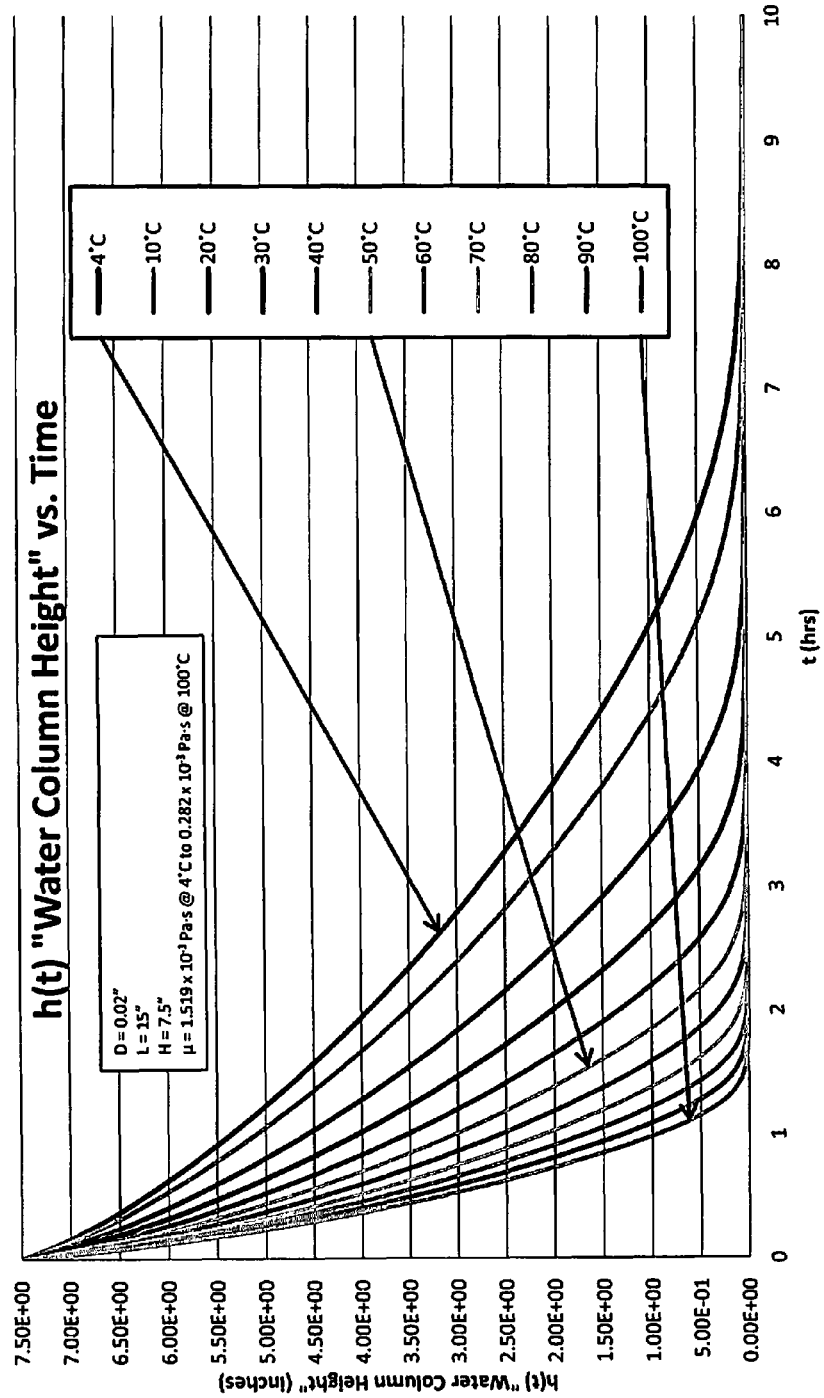
FIG. 18 is a graph of the change in viscosity effects on drain time.

FIG. 18 is a graph of the change in viscosity effects on drain time. The graph shows that as the viscosity of the fluid increases so does the drain time when the other 3 parameters are held constant. This occurs because more hydraulic head pressure and syphon force is required to drive a more viscous fluid through the tube.

The tube length is essentially the distance the fluid must travel, from the inlet of the tube assembly to the exit. This distance is important due to the fact that as the length increases, so does the amount of friction the fluid have to overcome to travel through the tube to exit. The increased friction causes reduced drain times.

Figure 19:
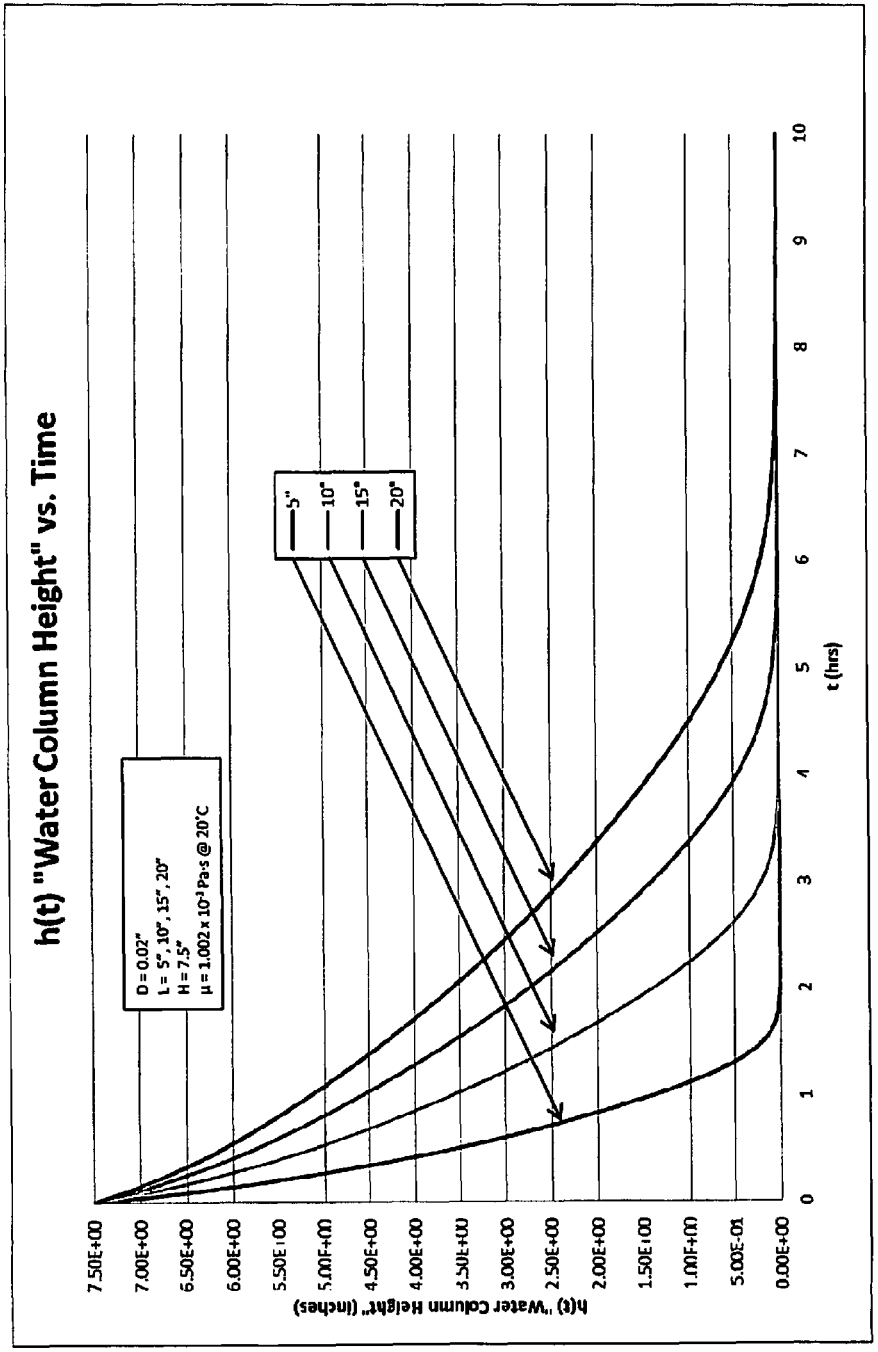
FIG. 19 is a graph showing the effects of change in tube length.

FIG. 19 is a graph showing the effects of change in tube length. The graph shows that as the tube length of the assembly increases so does the drain time when the other 3 parameters are held constant. This occurs because as the tube length increases so does the amount of friction the fluid has to overcome through the length of the tube.

The hydraulic diameter is essentially the diameter of the tube which fluid passes through. This diameter is important due to the fact that at a given head pressure flow can be varied by changing that diameter. The hydraulic diameter of the tube in the assembly is inversely proportional to the drain time.

Figure 20:
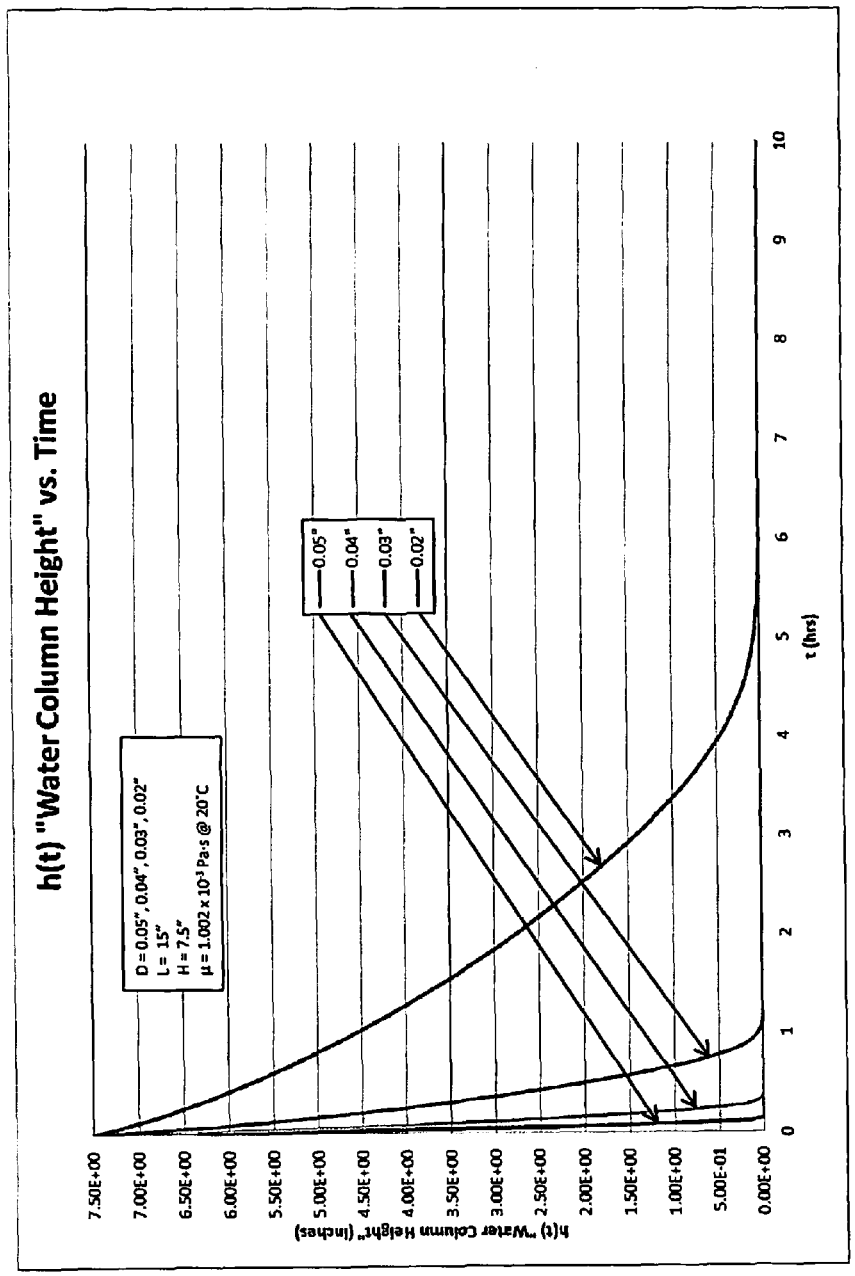
FIG. 20 is a graph showing the effects of change in hydraulic diameter.

FIG. 20 is a graph showing the effects of change in hydraulic diameter. The graph shows that as the hydraulic diameter of the tube in the assembly increases the drain time decreases when the other 3 parameters are held constant. This occurs due to the fact that as the hydraulic diameter of the tube increases, so does the cross-sectional area. The larger the cross-sectional area in a flow carrier, the greater capacity of flow the carrier will allow at a given pressure.

Figure 21:
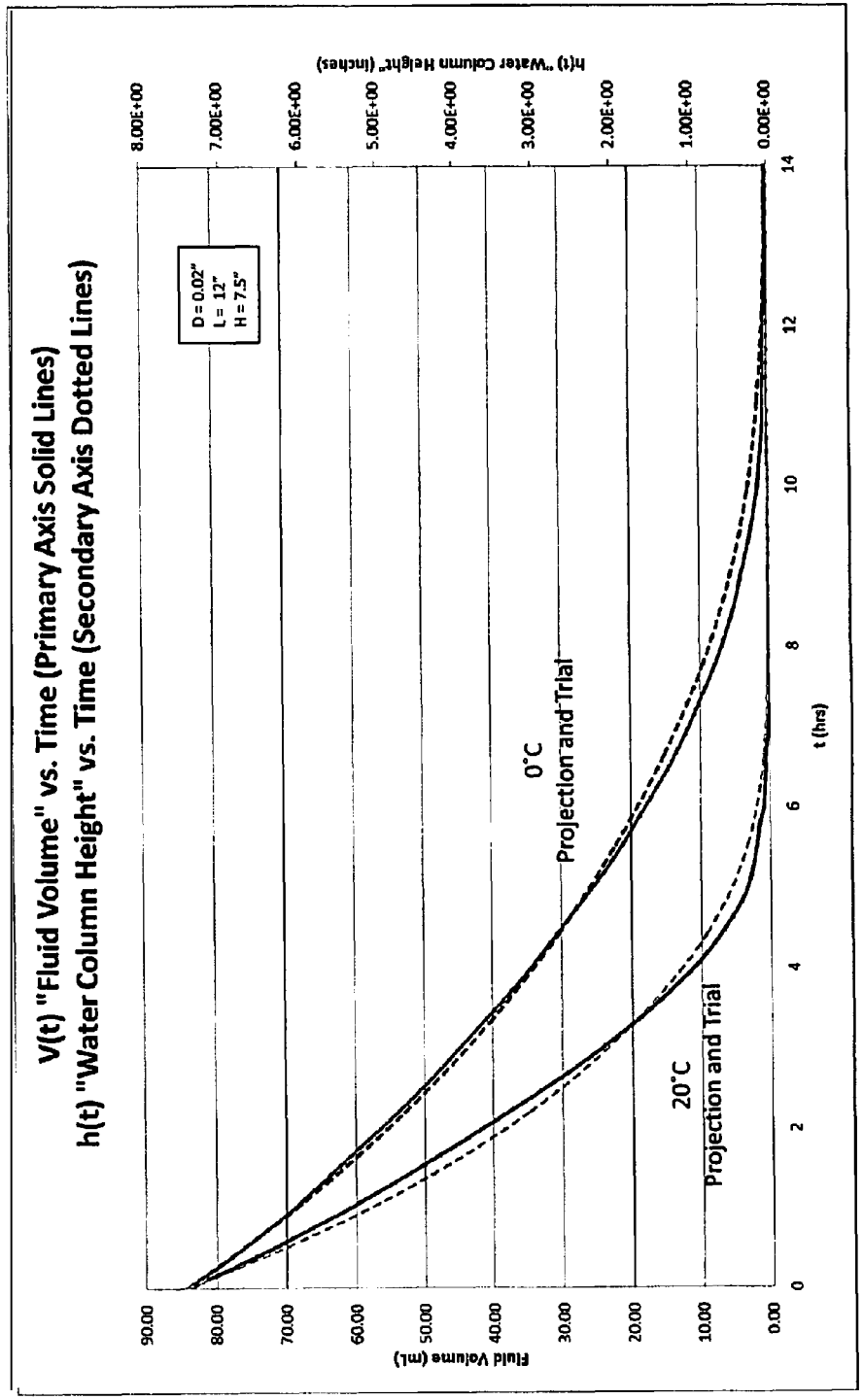
FIG. 21 is a graph showing the experiment verses model projections.

FIG. 21 is a graph showing the experiment verses model projections. This graph (generated using the derived model) has been overlaid with experimental data to show the predictability of the assembly using the model. One experiment was conducted at a temperature of 0° C. (fluid in liquid phase) and the other at 20° C.

The invention can use a metering block, one of varying size, shape and configuration, offering an integral channel of varying geometries is mated to a varying size and shape fluid channel from which internally reservoir liquid is transported and dispersed externally.

Utilizing the basics of fluid dynamics, elasticity of materials, atmospheric pressure, siphoning, and tubular capillary action, liquid is delivered in a metered, predictable manner hereto undisclosed in the prior art.

The novel drip bag, tube and fitment assembly can be used to dispense other fluids and liquids with different viscosities, such as but not limited to dripping buck jam, and the like. For example, an approximately 32 oz bag of buck jam with a tube hydraulic diameter of approximately ⅜ inch and a length of approximately 18 inches can be drained in approximately 6 days.

While a flexible bag is described, the invention can be used with other containers, such as bendable and/or semi-rigid containers, and the like. While the container/bag is described having three layers, the container/bag can be formed from other materials, and the like, such as but not limited to plastic, treated cardboard, various combinations of materials, and the like.

While a flexible tube is described, the invention can be used with other types of channels, conveyances, pathways, avenues, carriers, ducts, pipes, piping, fluting, veins, chases, grooves, conduits, chambers, continuances and the like.

Although the preferred embodiments of the invention are for dispensing animal attractant liquids, and the like, the invention can be used to dispense and drip other materials, such as but limited to insecticides, food, water, serums, medicinal fluids, lubricants, paints, dyes, solutions, engineering fluids, intravenous fluids, plasmas, nutrients, proteins, transportation fluids, and the like.

The term "liquids" referenced in the specification can include gels and other fluids of varying viscosity amounts, and the like.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A liquid dispensing assembly comprising:
a container having a fill portion and a dispensing portion, the container includes a flexible bag;
an elongated channel having an input end and an output end;
a first member for mounting the input end inside of the bag above the dispensing portion of the container;
a second member for mounting the output end of the channel adjacent the dispensing portion of the container, the position of the first member being above the second member; and
liquid inside of the container having a fill line above the first member, wherein the liquid inside of the container is siphoned out of the container by the liquid flowing into the input end of the channel and out of the output end of the channel.

2. A liquid dispensing assembly comprising:
a container having a fill portion and a dispensing portion;
an elongated channel having an input end and an output end;
a first member for mounting the input end inside of the bag above the dispensing portion of the container;
a second member for mounting the output end of the channel adjacent the dispensing portion of the container, the position of the first member being above the second member;
liquid inside of the container having a fill line above the first member, wherein the liquid inside of the container is siphoned out of the container by the liquid flowing into the input end of the channel and out of the output end of the channel; and
a hang hole adjacent to the fill portion of the container for allowing the container to be hung upright.

3. The liquid dispensing assembly of claim 1, further comprising:
a raised holder as the first member above a main member, wherein the second member is a main channel inside of the main member.

4. The liquid dispensing assembly of claim 1, further comprising:
a nozzle with external threads as the dispensing portion; and
a cap having internal threads for screwing about the external threads on the nozzle.

5. The liquid dispensing assembly of claim 1, wherein the container includes:
a height and a width, wherein the height of the container has a greater length than the width of the container.

6. The liquid dispensing assembly of claim 1, wherein the container has a fill line at least approximately several inches above the dispensing portion.

7. The liquid dispensing assembly of claim 1, wherein the channel includes a length of approximately 15 inches.

8. The liquid dispensing assembly of claim 7, wherein the channel includes an inner pathway of approximately 0.02 inches.

9. The liquid dispensing assembly of claim 1, wherein the liquid is an animal attractant liquid.

10. The liquid dispensing assembly of claim 1, wherein the liquid is a deer urine.

11. The liquid dispensing assembly of claim 1, wherein the elongated channel includes a flexible tube.

12. A siphon dispensing system comprising:
a flexible container having a top and a bottom, and a fill portion adjacent to the top of the flexible container;
a siphoning channel inside of the flexible container having an inlet end inside the container adjacent to and above the bottom of the flexible container, and an outlet end extending below the bottom of the flexible container; and
a fluid inside of the flexible container, the fluid being filled to a fluid line above the inlet end of the siphoning channel, wherein a dispensing action causes the fluid inside the flexible container to siphon through the inlet end of the siphoning channel and out the outlet end of the channel at a selected rate;
a hang mount for hanging the top of the flexible container in a raised position above the bottom of the flexible container, with the bottom of the flexible container raised and spaced above a ground surface; and
a dispensing mount mounted in the bottom of the container, the mount having an upwardly protruding portion for supporting the inlet end adjacent to the bottom of the container, and supporting a portion of the channel in a vertical orientation, wherein the dispensing mount includes a dispensing nozzle having an opening therethrough for supporting the outlet end of the channel below the bottom of the container.

13. The siphon dispensing system of claim 12, further comprising:
a mount for mounting the top of the container in a raised position above the bottom of the container, with the bottom raised above a ground surface.

14. The siphon dispensing system of claim 12, further comprising:
a cap for opening and closing the dispensing nozzle.

15. The siphon dispensing system of claim 12, wherein the dispensing nozzle includes a narrowing channel inside.

16. The siphon dispensing system of claim 12, wherein the flexible container includes a flexible bag.

17. The siphon dispensing system of claim 12, wherein the siphoning channel includes a flexible tube.

* * * * *